United States Patent [19]

Jäger

[11] Patent Number: 4,532,323

[45] Date of Patent: Jul. 30, 1985

[54] PROCESS FOR THE PREPARATION OF TRIPHENDIOXAZINE COMPOUNDS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 662,471

[22] Filed: Oct. 18, 1984

[30] Foreign Application Priority Data

Nov. 4, 1983 [DE] Fed. Rep. of Germany ....... 3339923

[51] Int. Cl.³ ............................................ C07D 498/04
[52] U.S. Cl. ....................................... 544/75; 544/76; 544/77
[58] Field of Search ............................... 544/75, 76, 77

[56] References Cited

U.S. PATENT DOCUMENTS 3,996,221 12/1976 Long et al. ....................... 544/75 X
4,400,504 8/1983 Harms et al. ......................... 544/76

*Primary Examiner*—Richard L. Raymond
*Attorney, Agent, or Firm*—Sprung, Horn, Kramer & Woods

[57] ABSTRACT

A new process for the preparation of triphendioxazine compounds is provided.

The process is characterized in that a 2,5-diarylaminobenzoquinone compound is treated with oleum in the presence of iodine or an inorganic iodine compound.

10 Claims, No Drawings

PROCESS FOR THE PREPARATION OF TRIPHENDIOXAZINE COMPOUNDS

The present invention relates to a new process for the preparation of triphendioxazine compounds.

It is known that triphendioxazine compounds can be prepared by cyclising 2,5-diarylamiobenzoquinone by means of condensation agents, such as sulphuric acid and oleum. However, it is frequently noticed that, particularly in the case of arylamino compounds containing sulpho groups, this cyclisation is difficult to accomplish and that fairly high temperatures and oleum of a fairly high percentage strength are required, under which circumstances the aryl nucleus can in some cases become sulphonated.

It has now been found that the addition of iodine or an inorganic iodine compound makes the cyclisation of 2,5-diarylaminobenzoquinone in oleum possible at markedly lower temperatures. The following may be mentioned as inorganic iodine compounds: sodium iodide, iodate and periodate, potassium iodide, iodate and periodate and hydriodic acid. 0.01 to 0.3, preferably 0.05 to 0.2, mole of iodine or inorganic iodine compound is employed per mole of 2,5-diarylaminobenzoquinone. The oleum used contains 10 to 50 percent by weight, preferably 20 to 40% by weight, of sulphur trioxide, and the reaction is carried out at 0° to 40° C., preferably at 10° to 30° C.

Examples which may be mentioned of 2,5-diarylaminobenzoquinone compounds which can be employed in accordance with the invention as starting compounds are compounds of the general formula (1):

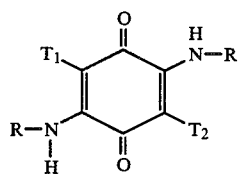

wherein $T_1$ and $T_2$ independently of one another are H, Cl, Br, $C_1$-$C_4$-alkoxy, $C_1$-$C_4$-alkyl or an optionally substituted phenyl or phenoxy radical and R is optionally substituted phenyl, naphthyl, carbazolyl or fluorenyl.

Examples of the substituents in the optionally substituted phenyl or phenoxy radicals $T_1$ and $T_2$ are Cl, $CH_3$, $C_2H_5$, $OCH_3$ and $OC_2H_5$.

Substituents in the radical R can, for example, be the following: alkyl, such as methyl, ethyl, n-propyl, n-butyl or cyclohexyl, alkoxy, such as methoxy, ethoxy, isopropoxy or cyclohexyloxy, fluorine, chlorine, bromine, carboxyl, sulpho, sulphamoyl, acylamino, such as acetylamino, propionylamino, ureido or benzoylamino, amino, alkylamino, such as methylamino, ethylamino, β-aminoethylamino, γ-aminopropylamino, β-sulphoethylamino or β-sulphatoethylamino, β-hydroxyethylsulphonyl, aryloxy, such as phenoxy, arylamino, such as anilino, benzylamino or cyclohexylamino, arylthio, phenyl, benzyl or phenylureido.

The alkyl, benzyl and phenyl radicals listed here can, of course, be further substituted, for example by $NH_2$, $NHCH_3$, $OCH_3$, $OC_2H_5$, $SO_3H$, $COOH$, $NHCOCH_3$, Cl, Br, —$NHSONH_2$, OH, $SCH_3$, $SO_2NH_2$, $CONH_2$, $N^+(CH_3)_3$ or $SO_2CH_2CH_2OSO_3H$.

The following may be mentioned as examples of the large number of radicals R which are suitable: 4-amino-3-sulphophenyl, 3-amino-4-sulphophenyl, 4-(4'-amino-3'-sulphoanilino)-3-sulphophenyl, 4-(3'-amino-4'-sulphoanilino)-3-sulphophenyl, 4-(2'-aminoethylamino)-3-sulphophenyl, 4-(3'-aminopropylamino)-3-sulphophenyl, 4-(4'-aminocyclohexylamino)-3-sulphophenyl, 4-ethylamino-3-sulphophenyl, 4-β-hydroxyethylamino-3-sulphophenyl, 4-β-methoxyethylamino-3-sulphophenyl, 6-amino-1,5-disulphonaphth-3-yl, 4-benzylamino-3-sulphophenyl, 4-phenoxy-3-sulphophenyl, 4-(2'-aminoethylamino)-3-(2'-sulphoethylsulphamoyl)-phenyl, 4-(2'-sulphoethylamino)-3-(2'-aminoethylsulphamoyl)-phenyl, 4-ethoxy-3-(2'-hydroxyethylsulphonyl)-phenyl and 4-methoxy-3-(2'-sulphatoethylsulphonyl)-phenyl.

In carrying out the reaction it has proved advantageous to introduce the 2,5-diarylaminobenzoquinones used into the oleum in the form of a mixture with an inert material.

Suitable inert materials are kieselguhr, quartz sand, finely ground clay, aluminium oxide and others.

Compounds of the formula (1) in which $T_1$ and $T_2=Cl$ are particularly preferred as the starting material.

The reaction product obtained in the cyclisation reaction is worked up by methods which are in themselves known. As far as details are concerned, reference should be made to the instructions in the preparation example.

The triphendioxazine dyestuffs containing sulpho groups can be used for dyeing wool or synthetic polyamides, whereas those which also contain amino groups in addition can be converted into reactive dyestuffs by acylation with, for example, dihalogenotriazines or trihalogenotriazines or di-, tri- or tetra-halogenopyrimidines.

EXAMPLE 23.75 g of 2,5-bis-[4-(2-aminoethylamino)-3-β-sulphoethylsulphamoylphenylamino]-3,6-dichlorobenzoquinone are intimately mixed with 10 g of kieselguhr, and the mixture is introduced at 20° to 30° C., in the course of 40 minutes and with vigorous stirring, into a mixture of 40 ml of 20% strength and 30 ml of 65% strength oleum. 0.5 g of potassium iodide is added at 20° C. The mixture is stirred for 45 minutes at 20° to 23° C. and the melt is then run into 500 g of ice and 100 ml of water at such a rate that the temperature does not exceed 10°. The precipitate is filtered off with suction, washed with 100 ml of water and introduced into 500 ml of water. The dyestuff is then dissolved by means of sodium hydroxide solution (pH 12), and the solution is clarified and its pH is adjusted to 7 with hydrochloric acid. 21 g of a blue triphendioxazine dyestuff powder are obtained after filtration with suction and drying.

I claim:

1. Process for the preparation of triphendioxazine compounds, characterized in that a 2,5-diarylaminobenzoquinone compound is treated with oleum in the presence of iodine or an inorganic iodine compound.

2. Process according to claim 1, characterised in that the inorganic iodine compound used is sodium iodide or iodate or potassium iodide or iodate.

3. Process according to claim 1, characterised in that 0.01 to 0.3 mole of iodine or inorganic iodine compound is used per mole of 2,5-diarylaminobenzoquinone.

4. Process according to claim 1, characterised in that 0.05 to 0.2 mole of iodine or inorganic iodine compound is used per mole of 2,5-diarylaminobenzoquinone.

5. Process according to claim 1, characterised in that oleum containing 10 to 50% by weight of sulphur trioxide is employed.

6. Process according to claim 1, characterised in that oleum containing 20 to 40 percent by weight of sulphur trioxide is employed.

7. Process according to claim 1, characterised in that the reaction is carried out at 0° to 40° C.

8. Process according to claim 1, characterised in that the reaction is carried out at 10° to 30° C.

9. Process according to claim 1, characterised in that the reaction is carried out in the presence of inert materials.

10. Process according to claim 1, characterised in that 2,5-diarylaminobenzoquinones of the formula

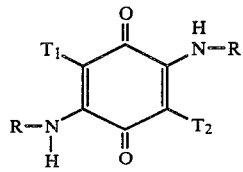

wherein
$T_1$ and $T_2$ independently of one another are H, Cl, Br, $C_1$–$C_4$-alkyl, $C_1$–$C_4$-alkoxy or an optionally substituted phenyl or phenoxy radical and
R is optionally substituted phenyl, naphthyl, carbazolyl or fluorenyl.

* * * * *